(12) United States Patent
Younes et al.

(10) Patent No.: US 11,492,255 B2
(45) Date of Patent: Nov. 8, 2022

(54) STEAM METHANE REFORMING WITH STEAM REGENERATION

(71) Applicant: Saudi Arabian Oil Company, Dhahran (SA)

(72) Inventors: Mourad Younes, Dhahran (SA); Aadesh Harale, Dhahran (SA); Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 327 days.

(21) Appl. No.: 16/839,781

(22) Filed: Apr. 3, 2020

(65) Prior Publication Data
US 2021/0309515 A1  Oct. 7, 2021

(51) Int. Cl.
*C01B 3/38* (2006.01)
*C01B 32/50* (2017.01)
(Continued)

(52) U.S. Cl.
CPC ............. *C01B 3/388* (2013.01); *B01D 53/22* (2013.01); *B01D 53/265* (2013.01);
(Continued)

(58) Field of Classification Search
CPC ......... C01B 3/388; C01B 3/503; C01B 32/50; C01B 2203/0233; C01B 2203/041;
(Continued)

(56) References Cited

U.S. PATENT DOCUMENTS 978,576 A    12/1910  Goodell
2,614,066 A  10/1952  Cornell
(Continued)

FOREIGN PATENT DOCUMENTS

AU   2003286894   6/2004
AU   2005286952   3/2006
(Continued)

OTHER PUBLICATIONS

Rohland et al., "Electrochemical hydrogen compressor," Electrochinica Acta, 1998, 43(24):3841-3846, 6 pages.
(Continued)

*Primary Examiner* — Steven J Bos
*Assistant Examiner* — Syed T Iqbal
(74) *Attorney, Agent, or Firm* — Fish & Richardson P.C.

(57) ABSTRACT

A hydrocarbon is reacted with water in the presence of a catalyst to form hydrogen, carbon monoxide, and carbon dioxide. Hydrogen is selectively allowed to pass through a hydrogen separation membrane to a permeate side of a reactor, while water and carbon-containing compounds remain in a retentate side of the reactor. An outlet stream is flowed from the retentate side to a heat exchanger. The outlet stream is cooled to form a cooled stream. The cooled stream is separated into a liquid phase and a vapor phase. The liquid phase is flowed to the heat exchanger and heated to form steam. The vapor phase is cooled to form condensed water and a first offgas stream. The first offgas stream is cooled to form condensed carbon dioxide and a second offgas stream. The steam and the second offgas stream are recycled to the reactor.

12 Claims, 5 Drawing Sheets

(51) Int. Cl.
  *B01D 53/22* (2006.01)
  *B01D 53/26* (2006.01)
  *B01J 19/00* (2006.01)
  *B01J 19/24* (2006.01)
  *C01B 3/50* (2006.01)

(52) U.S. Cl.
  CPC ........... *B01J 19/0013* (2013.01); *B01J 19/24* (2013.01); *C01B 3/503* (2013.01); *C01B 32/50* (2017.08); *B01J 2219/00087* (2013.01); *C01B 2203/0233* (2013.01); *C01B 2203/041* (2013.01); *C01B 2203/0833* (2013.01); *C01B 2203/0883* (2013.01); *C01B 2203/1241* (2013.01); *C01B 2203/1294* (2013.01)

(58) Field of Classification Search
  CPC .... C01B 2203/0833; C01B 2203/0883; C01B 2203/1241; C01B 2203/1294; C01B 3/384; C01B 2203/046; C01B 2203/0475; C01B 2203/0495; C01B 2203/0811; C01B 2203/085; C01B 2203/0894; C01B 2203/1058; C01B 2203/148; B01D 53/22; B01D 53/265; B01J 19/0013; B01J 19/24; B01J 2219/00087
  See application file for complete search history.

(56) References Cited

U.S. PATENT DOCUMENTS

| | | |
|---|---|---|
| 2,910,426 A | 10/1959 | Gluesenkamp |
| 3,278,268 A | 10/1966 | Pfefferle, Jr. |
| 3,409,540 A | 11/1968 | Gould et al. |
| 3,533,938 A | 10/1970 | Leas |
| 3,702,292 A | 11/1972 | Burich |
| 3,726,789 A | 4/1973 | Kovach |
| 3,755,143 A | 8/1973 | Hosoi et al. |
| 3,856,659 A | 12/1974 | Owen |
| 3,979,757 A | 9/1976 | Kilby et al. |
| 4,090,949 A | 5/1978 | Owen et al. |
| 4,134,824 A | 1/1979 | Kamm et al. |
| 4,264,435 A | 4/1981 | Read, Jr. et al. |
| 4,297,203 A | 10/1981 | Ford et al. |
| 4,426,276 A | 1/1984 | Dean et al. |
| 4,466,946 A | 8/1984 | Goddin, Jr. et al. |
| 4,527,003 A | 7/1985 | Okamoto et al. |
| 4,587,011 A | 5/1986 | Okamoto et al. |
| 4,589,896 A | 5/1986 | Chen et al. |
| 4,655,904 A | 4/1987 | Okamoto et al. |
| 4,717,407 A | 1/1988 | Choe et al. |
| 4,725,349 A | 2/1988 | Okamoto et al. |
| 4,786,400 A | 11/1988 | Farnsworth |
| 4,830,728 A | 5/1989 | Herbst et al. |
| 4,981,676 A | 1/1991 | Minet et al. |
| 4,992,160 A | 2/1991 | Long et al. |
| 5,091,351 A | 2/1992 | Murakawa et al. |
| 5,108,581 A | 4/1992 | Aldridge |
| 5,229,102 A | 7/1993 | Minet et al. |
| 5,366,712 A | 11/1994 | Violante |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,746,985 A | 5/1998 | Takahashi |
| 5,837,032 A | 11/1998 | Moll et al. |
| 5,904,837 A | 5/1999 | Fujiyama |
| 5,906,728 A | 5/1999 | Iaccino et al. |
| 5,951,850 A | 9/1999 | Ino et al. |
| 5,997,594 A | 12/1999 | Edlund et al. |
| 6,033,555 A | 3/2000 | Chen et al. |
| 6,119,606 A | 9/2000 | Clark |
| 6,153,163 A | 11/2000 | Prasad |
| 6,179,900 B1 | 1/2001 | Behling et al. |
| 6,180,081 B1 | 1/2001 | Poschmann et al. |
| 6,190,533 B1 | 2/2001 | Bradow et al. |
| 6,210,562 B1 | 3/2001 | Xie et al. |
| 6,274,032 B2 | 8/2001 | Hood et al. |
| 6,293,979 B1 | 9/2001 | Choudhary et al. |
| 6,296,686 B1 | 10/2001 | Prasad et al. |
| 6,338,833 B1 | 1/2002 | Aasberg-Petersen |
| 6,361,582 B1 | 3/2002 | Pinnau et al. |
| 6,531,515 B2 | 3/2003 | Moore, Jr. et al. |
| 6,656,346 B2 | 12/2003 | Ino et al. |
| 6,743,961 B2 | 6/2004 | Powers |
| 6,830,596 B1 | 12/2004 | Deckman et al. |
| 6,896,717 B2 | 5/2005 | Pinnau et al. |
| 6,960,235 B2 | 11/2005 | Morse et al. |
| 6,979,757 B2 | 12/2005 | Powers |
| 7,019,187 B2 | 3/2006 | Powers |
| 7,022,165 B2 | 4/2006 | Paglieri et al. |
| 7,025,941 B1 | 4/2006 | Autenrieth et al. |
| 7,045,554 B2 | 5/2006 | Raje |
| 7,132,042 B2 | 11/2006 | Genetti et al. |
| 7,182,917 B2 | 2/2007 | Krueger |
| 7,217,304 B2 | 5/2007 | Deckman et al. |
| 7,323,148 B2 | 1/2008 | Shah et al. |
| 7,353,982 B2 | 4/2008 | Li |
| 7,374,664 B2 | 5/2008 | Powers |
| 7,396,449 B2 | 7/2008 | Powers |
| 7,404,889 B1 | 7/2008 | Powers |
| 7,419,584 B2 | 9/2008 | Stell et al. |
| 7,527,661 B2 | 5/2009 | Chellappa et al. |
| 7,550,642 B2 | 6/2009 | Powers |
| 7,642,292 B2 | 1/2010 | Severinsky |
| 7,744,747 B2 | 6/2010 | Halsey |
| 7,858,834 B2 | 12/2010 | Powers |
| 7,871,457 B2 | 1/2011 | Shah et al. |
| 7,959,897 B2 | 6/2011 | Cui et al. |
| 7,972,498 B2 | 7/2011 | Buchanan et al. |
| 7,973,087 B2 | 7/2011 | Kibby et al. |
| 8,198,338 B2 | 6/2012 | Shulenberger et al. |
| 8,518,151 B2 | 8/2013 | Tessier et al. |
| 8,563,185 B2 | 10/2013 | Assink et al. |
| 8,585,802 B2 | 11/2013 | Keller |
| 8,597,383 B2 | 12/2013 | Pham et al. |
| 8,726,983 B2 | 5/2014 | Khan |
| 8,828,121 B1 | 9/2014 | He et al. |
| 8,900,546 B2 | 12/2014 | Van De Graaf et al. |
| 8,931,347 B2 | 1/2015 | Donzier et al. |
| 9,085,497 B2 | 7/2015 | Jennings |
| 9,096,806 B2 | 8/2015 | Abba et al. |
| 9,138,718 B2 | 9/2015 | Li et al. |
| 9,242,230 B2 | 1/2016 | Moon et al. |
| 9,255,230 B2 | 2/2016 | Shafi et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,328,035 B1 | 5/2016 | Kuhn et al. |
| 9,493,350 B2 | 11/2016 | Morico et al. |
| 9,752,080 B2 | 9/2017 | Christensen et al. |
| 9,863,244 B2 | 1/2018 | Donzier et al. |
| 9,952,192 B2 | 4/2018 | Donzier et al. |
| 10,357,759 B2 | 7/2019 | D'Souza et al. |
| 10,472,951 B2 | 11/2019 | Donzier et al. |
| 10,527,751 B2 | 1/2020 | Donzier et al. |
| 2002/0098394 A1 | 7/2002 | Keefer et al. |
| 2003/0041519 A1 | 3/2003 | Maruko |
| 2003/0129109 A1 | 7/2003 | Bronicki |
| 2003/0172589 A1 | 9/2003 | Krueger |
| 2004/0120889 A1 | 6/2004 | Shah et al. |
| 2005/0045034 A1 | 3/2005 | Paglieri et al. |
| 2005/0109037 A1 | 5/2005 | Deckman et al. |
| 2005/0109821 A1 | 5/2005 | Li |
| 2005/0211603 A1 | 9/2005 | Guillaume et al. |
| 2005/0217479 A1 | 10/2005 | Hale et al. |
| 2006/0013759 A1 | 1/2006 | Jiang et al. |
| 2006/0057060 A1 | 3/2006 | Sun et al. |
| 2006/0124445 A1 | 6/2006 | Labrecque et al. |
| 2007/0157517 A1 | 6/2007 | Tsay et al. |
| 2007/0180991 A1 | 8/2007 | Chellappa et al. |
| 2008/0001645 A1 | 1/2008 | Kuroki |
| 2008/0011644 A1 | 1/2008 | Dean et al. |
| 2008/0011645 A1 | 1/2008 | Dean |

(56) References Cited

U.S. PATENT DOCUMENTS

| | | | |
|---|---|---|---|
| 2008/0019902 A1 | 1/2008 | Rei et al. |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2009/0123364 A1 | 5/2009 | Forsyth et al. |
| 2009/0155650 A1 | 6/2009 | Cui et al. |
| 2010/0089795 A1 | 4/2010 | Fujiyama et al. |
| 2010/0137458 A1 | 6/2010 | Erling |
| 2010/0260657 A1 | 10/2010 | Niitsuma et al. |
| 2011/0076225 A1 | 3/2011 | Shah et al. |
| 2011/0083996 A1 | 4/2011 | Shafi et al. |
| 2011/0177410 A1 | 7/2011 | Assink et al. |
| 2011/0247500 A1 | 10/2011 | Akhras et al. |
| 2012/0111051 A1 | 5/2012 | Kulkarni et al. |
| 2012/0118011 A1* | 5/2012 | Terrien ............... C01B 3/48 62/619 |
| 2012/0168154 A1 | 7/2012 | Chinn et al. |
| 2012/0195824 A1 | 8/2012 | Van De Graaf et al. |
| 2012/0258037 A1 | 10/2012 | Pham et al. |
| 2012/0323059 A1 | 12/2012 | Liu et al. |
| 2013/0129610 A1 | 5/2013 | Kale |
| 2013/0156685 A1 | 6/2013 | Vauk et al. |
| 2013/0220884 A1 | 8/2013 | Bourane et al. |
| 2013/0233766 A1 | 9/2013 | Shafi et al. |
| 2013/0248419 A1 | 9/2013 | Abba |
| 2014/0170061 A1 | 6/2014 | Chaubey et al. |
| 2014/0363345 A1 | 12/2014 | Li et al. |
| 2015/0037246 A1 | 2/2015 | Morico et al. |
| 2015/0240717 A1 | 8/2015 | Starcher et al. |
| 2015/0290575 A1 | 10/2015 | Rothermel et al. |
| 2016/0214859 A1 | 6/2016 | Beltramini et al. |
| 2016/0264886 A1 | 9/2016 | Davydov |
| 2016/0325990 A1 | 11/2016 | Galloway |
| 2016/0340187 A1 | 11/2016 | Said et al. |
| 2017/0050845 A1 | 2/2017 | Lofberg et al. |
| 2018/0079643 A1 | 3/2018 | Mortensen et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0312767 A1 | 11/2018 | Al-Sayed et al. |
| 2018/0370796 A1 | 12/2018 | Mokheimer et al. |
| 2019/0003303 A1 | 1/2019 | Donzier et al. |
| 2019/0112535 A1 | 4/2019 | Kinzl et al. |
| 2019/0135624 A1 | 5/2019 | Mair |
| 2019/0376821 A1 | 12/2019 | Donzier et al. |
| 2021/0394152 A1 | 12/2021 | Harale et al. |
| 2021/0395083 A1 | 12/2021 | Harale et al. |
| 2021/0395085 A1 | 12/2021 | Paglieri et al. |

FOREIGN PATENT DOCUMENTS

| | | |
|---|---|---|
| AU | 2005287034 | 3/2006 |
| AU | 2010291148 | 3/2011 |
| AU | 2012243063 | 10/2012 |
| CA | 2458314 | 4/1999 |
| CA | 2580580 | 3/2006 |
| CA | 2580585 | 3/2006 |
| CA | 2547011 | 8/2008 |
| CA | 2414657 | 5/2011 |
| CA | 2547011 | 8/2011 |
| CA | 2938299 | 5/2015 |
| CN | 104098071 | 10/2014 |
| CN | 102482079 | 5/2016 |
| CN | 103596671 | 6/2016 |
| CN | 105197887 | 3/2017 |
| CN | 105776133 | 11/2017 |
| EP | 0130933 | 9/1987 |
| EP | 0684066 | 11/1995 |
| EP | 1024111 | 8/2000 |
| EP | 1294637 | 3/2003 |
| EP | 1789171 | 5/2007 |
| EP | 1789172 | 5/2007 |
| EP | 1829821 | 9/2007 |
| EP | 2035329 | 3/2009 |
| EP | 0909804 | 9/2010 |
| EP | 2696966 | 2/2014 |
| EP | 2825503 | 1/2015 |
| EP | 2473441 | 8/2018 |
| FR | 2943657 | 3/2009 |
| JP | H06345405 | 12/1994 |
| JP | H9278403 | 10/1997 |
| JP | H09278403 | 10/1997 |
| JP | 2943657 | 8/1999 |
| JP | 2001348205 | 12/2001 |
| JP | 2004502623 | 1/2004 |
| JP | 2004249264 | 9/2004 |
| JP | 2004352528 | 12/2004 |
| JP | 2007190455 | 8/2007 |
| JP | 2008513337 | 5/2008 |
| JP | 2008513338 | 5/2008 |
| JP | 4381033 | 10/2009 |
| JP | 2010266155 | 11/2010 |
| JP | 2011195352 | 10/2011 |
| JP | 2011195387 | 10/2011 |
| JP | 2011206612 | 10/2011 |
| JP | 2013503807 | 2/2013 |
| JP | 5390448 | 10/2013 |
| JP | 5588581 | 8/2014 |
| JP | 2014519463 | 8/2014 |
| JP | 5611627 | 9/2014 |
| JP | 2014169222 | 9/2014 |
| JP | 6040701 | 12/2016 |
| JP | 6345406 | 6/2018 |
| NO | 200701530 | 4/2007 |
| NO | 200701532 | 6/2007 |
| TW | 200619136 | 6/2006 |
| TW | 200630158 | 9/2006 |
| WO | WO 2000009633 | 2/2000 |
| WO | 2001064577 | 9/2001 |
| WO | WO2001064577 | 9/2001 |
| WO | 2002002460 | 1/2002 |
| WO | WO2002002460 | 1/2002 |
| WO | 2002070402 | 9/2002 |
| WO | WO2002070402 | 9/2002 |
| WO | 2004041714 | 5/2004 |
| WO | WO2004041714 | 5/2004 |
| WO | 2005051590 | 6/2005 |
| WO | WO2005051590 | 6/2005 |
| WO | 2006034086 | 3/2006 |
| WO | 2006034100 | 3/2006 |
| WO | 2006034103 | 3/2006 |
| WO | WO2006034086 | 3/2006 |
| WO | WO2006034100 | 3/2006 |
| WO | WO2006034103 | 3/2006 |
| WO | 2006082933 | 8/2006 |
| WO | WO2006082933 | 8/2006 |
| WO | 2006097703 | 9/2006 |
| WO | WO 2006097703 | 9/2006 |
| WO | WO2006097703 | 9/2006 |
| WO | 2007031713 | 3/2007 |
| WO | WO2007031713 | 3/2007 |
| WO | 2008000782 | 1/2008 |
| WO | WO2008000782 | 1/2008 |
| WO | WO 2009013455 | 1/2009 |
| WO | WO 2009073436 | 6/2009 |
| WO | WO 2010009077 | 1/2010 |
| WO | WO 2010009082 | 1/2010 |
| WO | WO 2010009089 | 1/2010 |
| WO | 2010109106 | 9/2010 |
| WO | WO2010109106 | 9/2010 |
| WO | WO 2010143783 | 12/2010 |
| WO | 2011026943 | 3/2011 |
| WO | WO2011026943 | 3/2011 |
| WO | 2012006429 | 1/2012 |
| WO | WO2012006429 | 1/2012 |
| WO | WO 2012006429 | 1/2012 |
| WO | 2012142009 | 10/2012 |
| WO | 2012143096 | 10/2012 |
| WO | WO2012142009 | 10/2012 |
| WO | WO2012143096 | 10/2012 |

(56) References Cited

FOREIGN PATENT DOCUMENTS

| WO | 2012158673 | 11/2012 |
|---|---|---|
| WO | WO 2012158673 | 11/2012 |
| WO | WO2012158673 | 11/2012 |
| WO | 2013137720 | 9/2013 |
| WO | WO2013137720 | 9/2013 |
| WO | WO 2015128045 | 9/2013 |
| WO | WO 2015183200 | 12/2015 |
| WO | WO 2016207892 | 12/2016 |
| WO | WO 2018226617 | 12/2018 |
| ZA | 201201141 | 10/2012 |
| ZA | 2012001141 | 10/2012 |

OTHER PUBLICATIONS

PCT International Search Report and Written Opinion in International Appln. No. PCT/US2021/024865, dated Jun. 28, 2021, 13 pages.

Abbassi et al., "Efficiency improvements in production profiling using ultracompact flow array sensing technology," Petrophysics, Aug. 2018, 59(4): 457-488.

Amo et al., "Low-Quality Natural Gas Sulfur Removal/Recovery," Membrane Technology and Research, DOE Report DE-AC21-92MC28133-01, Jan. 29, 1998, 107 pages.

Aschoundong et al., "Silane Modification of Cellulose Acetate Dense Films as Materials for Acid Gas Removal Macromolecules," Macromolecules, vol. 46, No. 14, Jul. 9, 2013, 11 pages.

Belov et al., "Gas transport and free volume in hexafluoropropylene polymers," Journal of Membrane Science, vol. 383, Nov. 2011, 8 pages.

Bernardo et al., "Gas transport properties of Pebax/room temperature ionic liquid gel membranes" Separation and Purification Technology vol. 97, Sep. 2012, 13 pages.

Bhide et al., "Hybrid processes for the removal of acid gases from natural gas," Journal of Membrane Science, vol. 140, Issue 1, Mar. 4, 1998, 2 pages, Abstract Only.

Chatterjee et al., "Poly(ether urethane) and poly(ether urethane urea) membranes with high $H_2S/CH_4$ selectivity," Journal of Membrane Science, vol. 135, No. 99, Nov. 1997, 8 pages.

Jansen et al., "On the unusual solvent and the effect on the gas transport in perfluorinated Hyflon AD Membranes," Journal of Membrane Science, vol. 287, Issue 1, Jan. 2007, 6 pages.

Kraftschik et al., "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refining: Processing, Operations & Maintenance, Apr. 2012, 14 pages.

Lockhart, "Sour oil and gas management: 3.3," vol. Lii/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346, Jan. 2010, 10 pages.

Merkel and Toy, "Comparison of Hydrogen Sulfide Transport Properties in Fluorinated and Nonfluorinated Polymers," Macromolecules, vol. 39, No. 22, Sep. 2006, 10 pages.

Mori et al., "Reactor configuration and concentration polarization in methane steam reforming by a membrane reactor with a highly hydrogen-permeable membrane," Industrial & Engineering Chemistiy Research, Feb. 2007, 46(7): 1952-1958.

Oi et al., "Simulation and cost comparison of CO2 liquefaction," Lars. 2016. Energy Procedia 86, 2016, 500-510, 11 pages.

Robeson, "The upper bound revisited," Journal of Membrane Science, vol. 320, Jul. 15, 2008, 11 pages.

Rufford et al., "The removal of CO2 and N2 from natural gas: A review of conventional and emerging process technologies," Journal of Petroleum Science and Engineering, vol. 94-95, Sep. 2012, 32 pages.

Wismann et al., "Electrified methane reforming: A compact approach to greener industrial hydrogen production," Science Magazine, May 2019, 364(6442): 756-759.

Xu et al., "An Improved CO2 Separation and Purification System Based on Cryogenic Separation and Distillation Theory," Gang, 2014, Energies 2014, 7, 3484-3502, ISSN 1996-1073, 19 pages.

Alvarez et al., "Ru—Ni catalyst in the combined dry-stream reforming of methane: the importance in the metal order addition," Topics in Catalysts, Jul. 2015, 59(2):303-313, 11 pages.

Boeltken et al., "Ultra-compact microstructured methane steam reformer with integrated Palladium membrane for on-site production of pure hydrogen: Experimental demonstration," International Journal of Hydrogen Energy, Elsevier Science Publishers, Jul. 2014, 39(31):18058-18068, 11 pages.

Chen et al., "Hydrogen production from the steam reforming of liquid hydrocarbons in membrane reactor," Catalysis Today, Elsevier, Oct. 2006, 118(1-2):136-143, 8 pages.

PCT International Search Report and Written Opinion in International Appln. No. PCT/US2021/036849, dated Sep. 13, 2021, 14 pages.

PCT International Search Report and Written Opinion in International Appln. No. PCT/US2021/036848, dated Sep. 13, 2021, 15 pages.

PCT International Search Report and Written Opinion in International Appln. No. PCT/US2021/036850, dated Sep. 13, 2021, 15 pages.

\* cited by examiner

STEAM METHANE REFORMING WITH STEAM REGENERATION

TECHNICAL FIELD

This disclosure relates to reforming of hydrocarbons.

BACKGROUND

Methane reforming involves chemical synthesis of hydrogen gas from hydrocarbons (such as methane) by use of a catalyst. Steam reforming (sometimes referred to as steam methane reforming) is a type of methane reforming in which hydrocarbons are converted in the presence of steam to form syngas (a mixture of hydrogen and carbon monoxide). In some cases, the syngas can react further to produce carbon dioxide and more hydrogen.

SUMMARY

This disclosure describes technologies relating to reforming of hydrocarbons. Certain aspects of the subject matter can be implemented as a method. Within a reactor, a hydrocarbon is reacted with water in the presence of a catalyst to form hydrogen, carbon monoxide, and carbon dioxide. By a hydrogen separation membrane positioned within the reactor, hydrogen is selectively allowed to pass through the hydrogen separation membrane to a permeate side of the reactor, while preventing water and carbon-containing compounds from passing through the hydrogen separation membrane and remaining in a retentate side of the reactor. An outlet stream is flowed from the retentate side of the reactor to a first side of a heat exchanger. In the first side of the heat exchanger, the outlet stream is cooled to form a cooled stream. The cooled stream is separated by a separator into a liquid phase and a vapor phase. The liquid phase includes a portion of unreacted water from the reactor. The vapor phase includes a portion of hydrogen formed within the reactor, a portion of unreacted hydrocarbon from the reactor, carbon monoxide formed within the reactor, and carbon dioxide formed within the reactor. The liquid phase is flowed from the separator to a second side of the heat exchanger. In the second side of the heat exchanger, the liquid phase is heated to form steam. The vapor phase is cooled to form condensed water and a first offgas stream. The first offgas stream is cooled to form condensed carbon dioxide and a second offgas stream. The steam and the second offgas stream are recycled to the reactor.

This, and other aspects, can include one or more of the following features.

Reacting the hydrocarbon with water in the presence of the catalyst can include reacting methane with water in the presence of the catalyst at an operating temperature in a range of from about 400 degrees Celsius (° C.) to about 600° C. and at an operating pressure in a range of from about 10 bar to about 40 bar.

Cooling the outlet stream in the first side of the heat exchanger can include cooling the outlet stream to a temperature that is about 5° C. to about 15° C. greater than a saturation temperature associated with the pressure of the permeate side of the reactor.

Pressure of the liquid phase can be decreased by an expansion device before flowing the liquid phase to the second side of the heat exchanger.

Heating the liquid phase in the second side of the heat exchanger can include latent heating and sensible heating, such that the steam that is formed is superheated steam.

The liquid phase from the separator can be purified before flowing the liquid phase to the second side of the heat exchanger.

The condensed water can be separated from the first offgas stream before cooling the first offgas stream.

Cooling the first offgas stream can include cooling the first offgas stream to a temperature in a range of from about −55° C. to about −20° C.

The condensed carbon dioxide can be purified to form a carbon dioxide product stream.

A second outlet stream can be flowed from the permeate side of the reactor. The second outlet stream can include a remaining portion of hydrogen formed within the reactor. The second outlet stream can be purified to form a hydrogen product stream.

The second outlet stream can be cooled to condense at least a portion of water present in the second outlet stream. The condensed portion of water can be separated from the second outlet stream. The condensed portion of water separated from the second outlet stream can be flowed to the second side of the heat exchanger.

The second outlet stream can be cooled to condense at least a portion of water present in the second outlet stream. The condensed portion of water can be separated from the second outlet stream. The pressure of the condensed portion of water separated from the second outlet stream can be decreased. The condensed portion of water with decreased pressure can be heated to produce a second stream of steam. The second stream of steam can be flowed to the permeate side of the reactor.

Certain aspects of the subject matter can be implemented as a system. The system includes a reactor, a heat exchanger, a separator, and a liquefaction unit. The reactor is configured to react a hydrocarbon and steam in the presence of a catalyst to produce hydrogen carbon monoxide, and carbon dioxide. The reactor includes a permeate side, a retentate side, and a hydrogen separation membrane positioned between the permeate side and the retentate side. The hydrogen separation membrane is configured to selectively allow hydrogen to pass through the hydrogen separation membrane to the permeate side of the reactor, while preventing water and carbon-containing compounds from passing through the hydrogen separation membrane. The system includes an outlet stream from the reactor. The heat exchanger includes a first side and a second side. The heat exchanger is configured to cool the outlet stream in the first side to form a cooled stream. The system includes the cooled stream from the first side of the heat exchanger. The separator is configured to receive and separate the cooled stream into a liquid phase and a vapor phase. The system includes the liquid phase and the vapor phase. The liquid phase includes a portion of unreacted water from the reactor. The vapor phase includes a portion of hydrogen produced within the reactor, a portion of unreacted hydrocarbon from the reactor, a portion of carbon monoxide produced within the reactor, and a portion of carbon dioxide produced within the reactor. The heat exchanger is configured to heat the liquid phase in the second side to form steam. The system includes the steam from the second side of the heat exchanger. The liquefaction unit is configured to receive the vapor phase from the separator. The liquefaction unit is configured to cool the vapor phase to form condensed water and a first offgas stream. The liquefaction unit is configured to cool the first offgas stream to form condensed carbon dioxide and a second offgas stream. The system includes the second offgas stream from the liquefaction unit. The reactor is configured to receive, in the retentate side, the second offgas stream from the liquefaction unit and the steam from the second side of the heat exchanger.

This, and other aspects, can include one or more of the following features.

The system can be independent of (that is, not include) a water shift reactor that is distinct from the reactor.

The system can include an expansion device downstream of the separator and upstream of the second side of the heat exchanger. The expansion device can be configured to decrease pressure of the liquid phase. The expansion device can include a restriction device, a control valve, a turbine, or any combination of these.

The heat exchanger can have a temperature pinch point that is in a range of from about 3° C. differential to about 30° C. differential.

The steam from the second side of the heat exchanger can include superheated steam.

The liquefaction unit can include a second separator configured to separate the condensed water from the first offgas stream.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes reforming of hydrocarbons (for example, steam methane reforming). Hydrocarbons (such as methane, $CH_4$) can react with water (in the form of steam, $H_2O$) in the presence of a catalyst to produce hydrogen ($H_2$), carbon monoxide (CO), and carbon dioxide ($CO_2$). A few reactions associated with steam methane reforming include:

$$CH_4 + H_2O \leftrightarrow 3H_2 + CO \quad (1)$$

$$CO + H_2O \leftrightarrow H_2 + CO_2 \quad (2)$$

$$CH_4 + 2H_2O \leftrightarrow 4H_2 + CO_2 \quad (3)$$

Reaction (2) is also known as the water-shift reaction. By Le Chatelier's Principle, increasing the amount of water (which is a reactant) in a steam methane reformer can shift both Reactions (1), (2), and (3) to the right toward the products, which can result in increased hydrogen and carbon dioxide production.

The subject matter described in this disclosure can be implemented in particular implementations, so as to realize one or more of the following advantages. Steam can be re-generated and recycled to the steam methane reformer, thereby decreasing the need for new steam generation in comparison to existing systems. Hydrogen production can be increased within the steam methane reformer due to the increased injection of steam. In some implementations, the increased injection of steam to the steam methane reformer allows for omission of a separate water shift reactor, resulting in decreased capital and operating costs. The introduction of excess steam can mitigate the risk of catalyst coking. Furthermore, the steam can provide heat to the endothermic reaction(s).

Figure 1A:
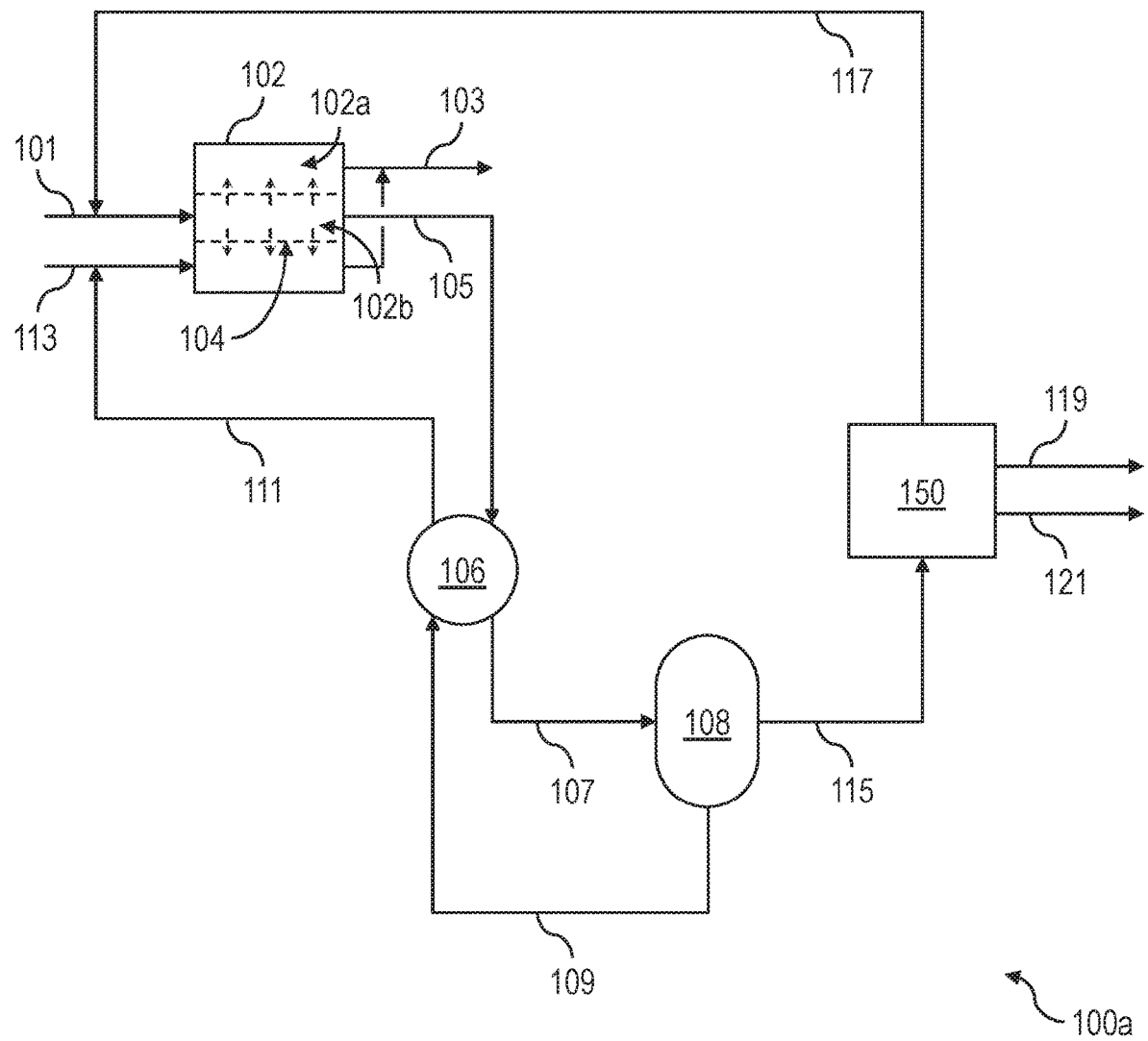
FIG. 1A is a schematic block diagram of an example system for hydrocarbon reforming.

Referring to FIG. 1A, a system 100a includes a methane reformer 102. The methane reformer 102 includes a pressure vessel within a reaction (such as steam methane reforming) can take place. The methane reformer 102 includes a metal-based catalyst, such as a nickel catalyst, which can accelerate the rate of Reaction (1), Reaction (2), Reaction (3) or any combination of these within the methane reformer 102. In some implementations, a heat source (not shown) provides heat to the methane reformer 102 to regulate temperature within the methane reformer 102. For example, an electric heater, a furnace, or a heat loop provides heat to the methane reformer 102.

The methane reformer 102 includes a permeate side 102a and a retentate side 102b. The methane reformer 102 includes a hydrogen separation membrane 104 positioned between the permeate side 102a and the retentate side 102b. The hydrogen separation membrane 104 is the boundary between the permeate side 102a and the retentate side 102b. In some implementations, the hydrogen separation membrane 104 has the form of a flat wall within the methane reformer 102 that separates the permeate side 102a from the retentate side 102b. In some implementations, the hydrogen separation membrane 104 has the form of a cylindrical wall, in which the permeate side 102a is the inner volume of the cylindrical wall, and the retentate side 102b is the annular volume between the cylindrical wall and the wall of the methane reformer 102. In some implementations (as shown in FIG. 1A), the hydrogen separation membrane 104 has the form of a cylindrical wall, in which the retentate side 102b is the inner volume of the cylindrical wall, and the permeate side 102a is the annular volume between the cylindrical wall and the wall of the methane reformer 102. The hydrogen separation membrane 104 is configured to selectively allow $H_2$ to pass through the hydrogen separation membrane 104 to the permeate side 102a, while preventing water and carbon-containing compounds (such as $CH_4$, CO, and $CO_2$) from passing through the hydrogen separation membrane 104. The water and carbon-containing compounds therefore remain in the retentate side 102b.

In some implementations, the hydrogen separation membrane 104 includes a ceramic or metallic support. In some implementations, the support has a tubular shape. In some implementations, the support is porous. In some implementations, the hydrogen separation membrane 104 includes a metallic layer deposited on an inner surface of the support. In some implementations, the hydrogen separation membrane 104 includes a metallic layer deposited on an outer surface of the support. In some implementations, the hydrogen separation membrane 104 includes a metallic layer deposited on the inner surface of the support and another metallic layer deposited on the outer surface of the support. In some implementations, the metallic layer is a layer of palladium. In some implementations, the thickness of the metallic layer is at least about 3 micrometers (μm). In some implementations, the thickness of the metallic layer is at most about 20 μm. In some implementations, the thickness of the metallic layer is in a range of from about 4 μm to about 20 μm.

In some implementations, the metal-based catalyst is incorporated into or disposed on a surface of the hydrogen separation membrane 104. In some implementations, the metal-based catalyst is incorporated into or disposed on another surface of the methane reformer 102 that surrounds the hydrogen separation membrane 104. In some implementations, the metal-based catalyst is disposed in a section of the methane reformer 102 that is upstream of the hydrogen separation membrane 104. In some implementations, the metal-based catalyst is distributed along a length of the reactor 102 at various locations surrounding the hydrogen separation membrane 104.

A hydrocarbon stream 101 flows to the methane reformer 102. The hydrocarbon stream 101 includes one or more hydrocarbons, such as $CH_4$. The hydrocarbon stream 101 can be flowed to the retentate side 102b of the methane reformer 102. Steam flows to the methane reformer 102. As mentioned previously, introducing more steam to the methane reformer 102 can facilitate the reactions associated with steam methane reforming (Reactions (1), (2), and (3)). In some implementations, steam is flowed with the hydrocarbon stream 101 to the methane reformer 102. In some implementations, steam is flowed to the permeate side 102a of the methane reformer 102. Flowing steam to the permeate side 102a of the methane reformer 102 can increase the flow of hydrogen through the hydrogen separation membrane 103. In some implementations, steam is flowed to the retentate side 102b of the methane reformer 102, for example, to facilitate the reactions associated with steam methane reforming (Reactions (1), (2), and (3)). Within the methane reformer 102, $CH_4$ and $H_2O$ (in the form of steam) is converted into $H_2$, CO, and $CO_2$. Due to the hydrogen separation membrane 104, $H_2$ can pass through to the permeate side 102a, while $H_2O$ and the carbon-containing compounds (such as unreacted $CH_4$, CO, and $CO_2$) remain within the retentate side 102b.

A permeate stream 103 flows from the permeate side 102a of the methane reformer 102. The permeate stream 103 includes $H_2$ that was produced within the methane reformer 102. In some implementations, the permeate stream 103 includes $H_2O$. In some implementations, the permeate stream 103 is processed to form an $H_2$ product stream. For example, the permeate stream 103 is processed to purify the permeate stream 103 and remove $H_2O$ and any other contaminants.

A retentate stream 105 flows out of the retentate side 102b of the methane reformer 102. The retentate stream 105 includes $CO_2$ and CO. In some implementations, the retentate stream 105 includes unreacted $H_2O$ and unreacted $CH_4$. In some implementations, the retentate stream 105 includes $H_2$ that was produced within the methane reformer 102 that did not pass through the hydrogen separation membrane 104 to the permeate side 102a and instead remained within the retentate side 102b.

The system 100a includes a heat exchanger 106. The heat exchanger 106 includes a first side and a second side. The heat exchanger 106 is configured to transfer heat between the first and second sides. The heat exchanger 106 can be of any type that is known in the art. For example, the heat exchanger 106 can be a shell-and-tube type heat exchanger, a plate heat exchanger, or a double pipe heat exchanger.

The retentate stream 105 flows to the first side of the heat exchanger 106. The heat exchanger 106 is configured to cool the retentate stream 105 to form a cooled stream 107. Cooling the retentate stream 105 in the first side of the heat exchanger 106 can cause one or more components (such as $H_2O$) in the retentate stream 105 to condense. Therefore, in some implementations, the cooled stream 107 exits the first side of the heat exchanger 106 as a mixed phase stream (for example, a mixture of liquid and vapor).

The system 100a includes a separator 108. The cooled stream 107 flows to the separator 108. The separator 108 includes a pressure vessel and is configured to separate the cooled stream 107 into a liquid phase 109 and a vapor phase 115. The liquid phase 109 includes water condensed from the retentate stream 105. The vapor phase 115 includes the components of the retentate stream 105 that did not condense. For example, the vapor phase 115 includes $H_2$, $CH_4$, $CO_2$, CO, or any combination of these.

The liquid phase 109 flows to the second side of the heat exchanger 106. The heat exchanger 106 is configured to heat the liquid phase 109 to form steam 111. Heating the liquid phase 109 in the second side of the heat exchanger 106 can cause the water in the liquid phase 109 to vaporize. Heating in the second side of the heat exchanger 106 can include latent heating (evaporation) and sensible heating (increasing temperature without phase change). For example, the liquid phase 109 can be evaporated in the second side of the heat exchanger 106 to form steam, and the steam can be further heated in the second side of the heat exchanger 106 to form superheated steam. Therefore, the steam 111 can be superheated steam.

Heat is transferred from the retentate stream 105 flowing through the first side of the heat exchanger 106 to the liquid phase 109 flowing through the second side of the heat exchanger 106. The system 100a, therefore, implements heat integration (heat transfer between process streams), which can provide savings in both capital and operating costs. In some implementations, the heat exchanger 106 has a temperature pinch point that is in a range of from 1 degree Celsius differential to 100 degrees Celsius (° C.) differential. In some implementations, the heat exchanger 106 has a temperature pinch point that is in a range of from about 3° C. differential to about 30° C. differential.

The steam 111 flows back to the methane reformer 102. In some implementations, steam 111 flows to the permeate side 102a of the methane reformer 102. In some implementations, steam 111 flows to the retentate side 102b of the methane reformer 102. In some implementations, steam 111 flows to both the permeate side 102a and the retentate side 102b of the methane reformer 102. In some implementations, make-up steam 113 flows to the methane reformer 102. In some implementations, make-up steam 113 flows to the permeate side 102a of the methane reformer 102. In some implementations, make-up steam 113 flows to the retentate side 102b of the methane reformer 102. In some implementations, make-up steam 113 flows to both the permeate side 102a and the retentate side 102b of the methane reformer 102. In some implementations, steam 111 from the second side of the heat exchanger 106 mixes with the make-up steam 113, and the mixture flows to the methane reformer 102.

Because unreacted $H_2O$ from the methane reformer 102 is vaporized and recycled to the methane reformer 102, the system 100a can require less steam generation in comparison to existing systems. Furthermore, the increased injection of steam into the methane reformer 102 can allow for the system 100a to produce the desired products ($H_2$ and $CO_2$) without requiring a separate water shift reactor (distinct from the methane reformer 102). Reactions (1), (2), and (3) occur within the methane reformer 102 to an adequate extent, and the system 100a does not need a separate water shift reactor for Reaction (2) to produce more $H_2$ and $CO_2$.

The system 100a includes a liquefaction unit 150. The vapor phase 115 flows to the liquefaction unit 150. The liquefaction unit 150 is configured to cool the vapor phase 115 to form condensed water 121. In some implementations, the liquefaction unit 150 includes a second separator (not shown) configured to separate the condensed water from the remaining, non-condensed vapor. The condensed water 121 can be disposed or processed and re-used. In some implementations, the liquefaction unit 150 includes an adsorber that removes water from the vapor phase 115. In some implementations, the liquefaction unit 150 is configured to decrease the dew point of water in the vapor phase 115, such that the dew point of water in the vapor phase is less than the coolest operating temperature of the liquefaction unit 150 in order to avoid frost formation.

The liquefaction unit 150 is configured to cool the remaining, non-condensed vapor from the vapor phase 115 to form condensed $CO_2$ 119 and an offgas stream 117. In some implementations, the condensed $CO_2$ 119 is processed to form a $CO_2$ product stream. For example, the condensed $CO_2$ 119 is processed to purify the condensed $CO_2$ 119 and remove any contaminants.

The offgas stream 117 includes the remaining vapor from the vapor phase 115 that was not condensed by the liquefaction unit 150. For example, the offgas stream 117 includes $H_2$, $CH_4$, CO, $CO_2$ (any residual vapor $CO_2$ that was not condensed by the liquefaction unit 150), or any combination of these. The offgas stream 117 flows back to the methane reformer 102. In some implementations, the offgas stream 117 flows to the retentate side 102b of the methane reformer 102. In some implementations, the offgas stream 117 mixes with the hydrocarbon stream 101, and the mixture flows to the methane reformer 102.

Figure 1B:
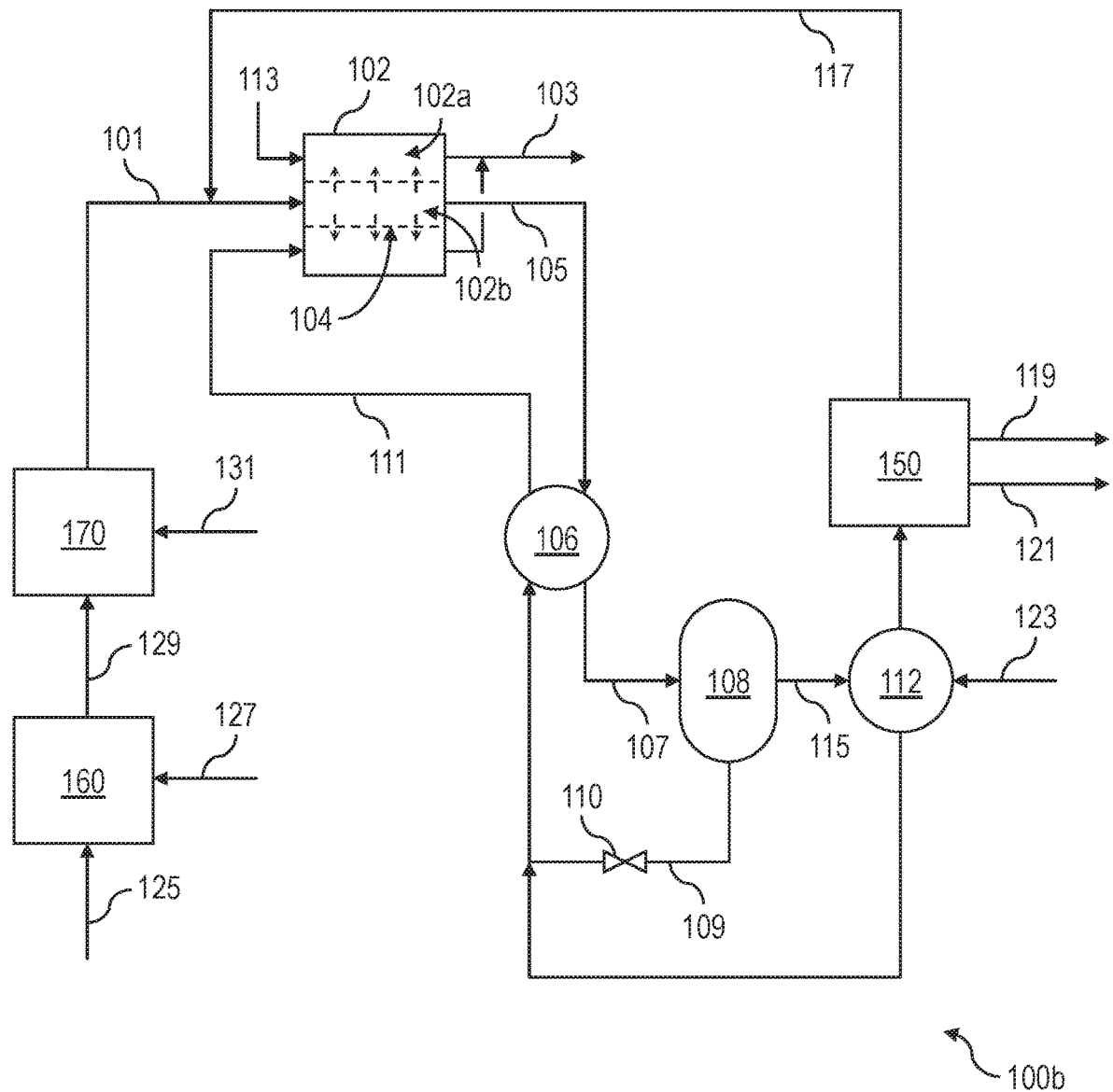
FIG. 1B is a schematic block diagram of an example system for hydrocarbon reforming.

FIG. 1B illustrates an implementation of a system 100b. The system 100b is substantially similar to the system 100a shown in FIG. 1A but includes some additional features. Apart from those already mentioned with respect to system 100a, system 100b includes a sulfur removal unit 160 and a pre-reformer 170.

A feedstock stream 125 flows to the sulfur removal unit 160. The feedstock stream 125 can include hydrocarbons and sulfur-containing compounds. The feedstock stream 125 can be, for example, a production stream from a well formed in a subterranean formation. The sulfur removal unit 160 is configured to remove sulfur from the feedstock stream 125. A hydrogen stream 127 can be flowed to the sulfur removal unit 160. The hydrogen in the hydrogen stream 127 can be used to hydrogenate the sulfur-containing compounds, resulting in sulfur-free hydrocarbons and hydrogen sulfide ($H_2S$). The $H_2S$ can be separated from the hydrocarbons and disposed. The sulfur removal unit 160 can implement any known process and equipment to remove sulfur, for example, hydrodesulfurization and zinc oxide-based sorbent.

The resulting sulfur-free hydrocarbon stream 129 flows to the pre-reformer 170. The pre-reformer 170 is configured to crack hydrocarbons into shorter hydrocarbons (for example, $CH_4$). In some implementations, the pre-reformer 170 implements thermal cracking of hydrocarbons. In some implementations, the pre-reformer 170 implements steam cracking of hydrocarbons. In such implementations, steam 131 can be flowed to the pre-reformer 170. The pre-reformer 170 produces a hydrocarbon stream 101 rich in $CH_4$. The hydrocarbon stream 101 can be flowed to the methane reformer 102.

System 100b includes an expansion device 110 downstream of the separator 108 and upstream of the second side of the heat exchanger 106. The liquid phase 109 flows from the separator 108 to the expansion device 110. The expansion device 110 is configured to decrease pressure of the liquid phase 109. The decrease in pressure can facilitate the re-generation of steam 111. The expansion device 110 can include a restriction orifice, a control valve, a turbine, or any combination of these. In some implementations, the expansion device 110 causes at least a portion of the liquid phase 109 to flash (that is, evaporate) due to the decrease in pressure. The fluid then flows from the expansion device 110 to the heat exchanger 106.

System 100b includes a second heat exchanger 112. Make-up water 123 can flow through the second heat exchanger 112. The vapor phase 115 can flow through the second heat exchanger 112 before flowing to the liquefaction unit 150. Heat can be transferred from the vapor phase 115 to the make-up water 123 in the second heat exchanger 112. Therefore, the vapor phase 115 can be pre-cooled before being cooled down further in the liquefaction unit 150. The heated make-up water 123 from the second heat exchanger 112 can mix with the liquid phase 109 upstream or downstream of the expansion device 110.

Figure 1C:
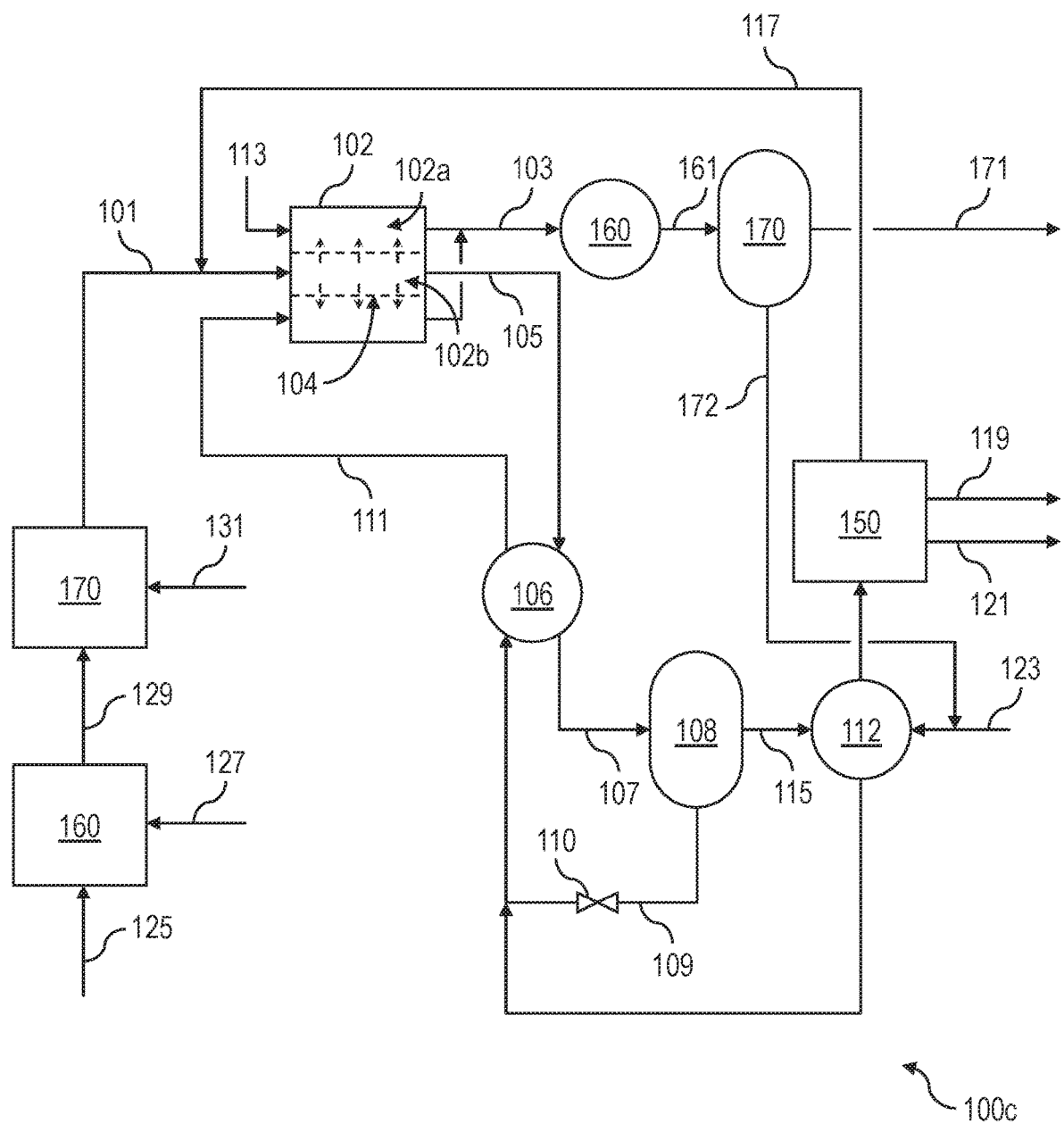
FIG. 1C is a schematic block diagram of an example system for hydrocarbon reforming.

FIG. 1C illustrates an implementation of a system 100c. The system 100c is substantially similar to the system 100b shown in FIG. 1B but includes some additional features. Apart from those already mentioned with respect to system 100b, system 100c includes a second heat exchanger 160 and a second phase separator 170.

The permeate stream 103 flows to the second heat exchanger 160. The second heat exchanger 160 is configured to cool the permeate stream 103. In some implementations, the second heat exchanger 160 is configured to cool the permeate stream 103 to form a second cooled stream 161 with a temperature in a range of from about 40° C. to about 130° C. Cooling the permeate stream 103 by the second heat exchanger 160 can cause one or more components (such as $H_2O$) in the permeate stream 103 to condense. Therefore, in some implementations, the second cooled stream 161 exits the second heat exchanger 160 as a mixed phase stream (for example, a mixture of liquid and vapor). The second heat exchanger 160 can be of any type that is known in the art. For example, the second heat exchanger 160 can be a shell-and-tube type heat exchanger, a plate heat exchanger, or a double pipe heat exchanger.

In some implementations, the permeate stream 103 exchanges heat with ambient water or ambient air via the second heat exchanger 160. In some implementations, the second heat exchanger 160 is heat integrated. For example, the permeate stream 103 exchanges heat, via the second heat exchanger 180, with another process stream, such as the make-up water 123, the feedstock stream 125, or the sulfur-free hydrocarbon stream 129.

The second cooled stream 161 exiting the second heat exchanger 160 flows to the second separator 170. The second separator 170 includes a pressure vessel and is configured to separate the second cooled stream 161 into a second vapor phase 171 and a second liquid phase 172. The second vapor phase 171 includes the components of the permeate stream 103 that did not condense in the second heat exchanger 160 and is rich in hydrogen. In some implementations, the second vapor phase 171 is the hydrogen product stream. In some implementations, the second vapor phase 171 is further processed (for example, purified to meet hydrogen product specifications) to form the hydrogen product stream. The second liquid phase 172 includes water condensed from the permeate stream 103. In some implementations, the second liquid phase 172 is compressed and mixed with the make-up water stream 123 to reduce the amount of fresh water consumption by the system 100c.

Figure 1D:
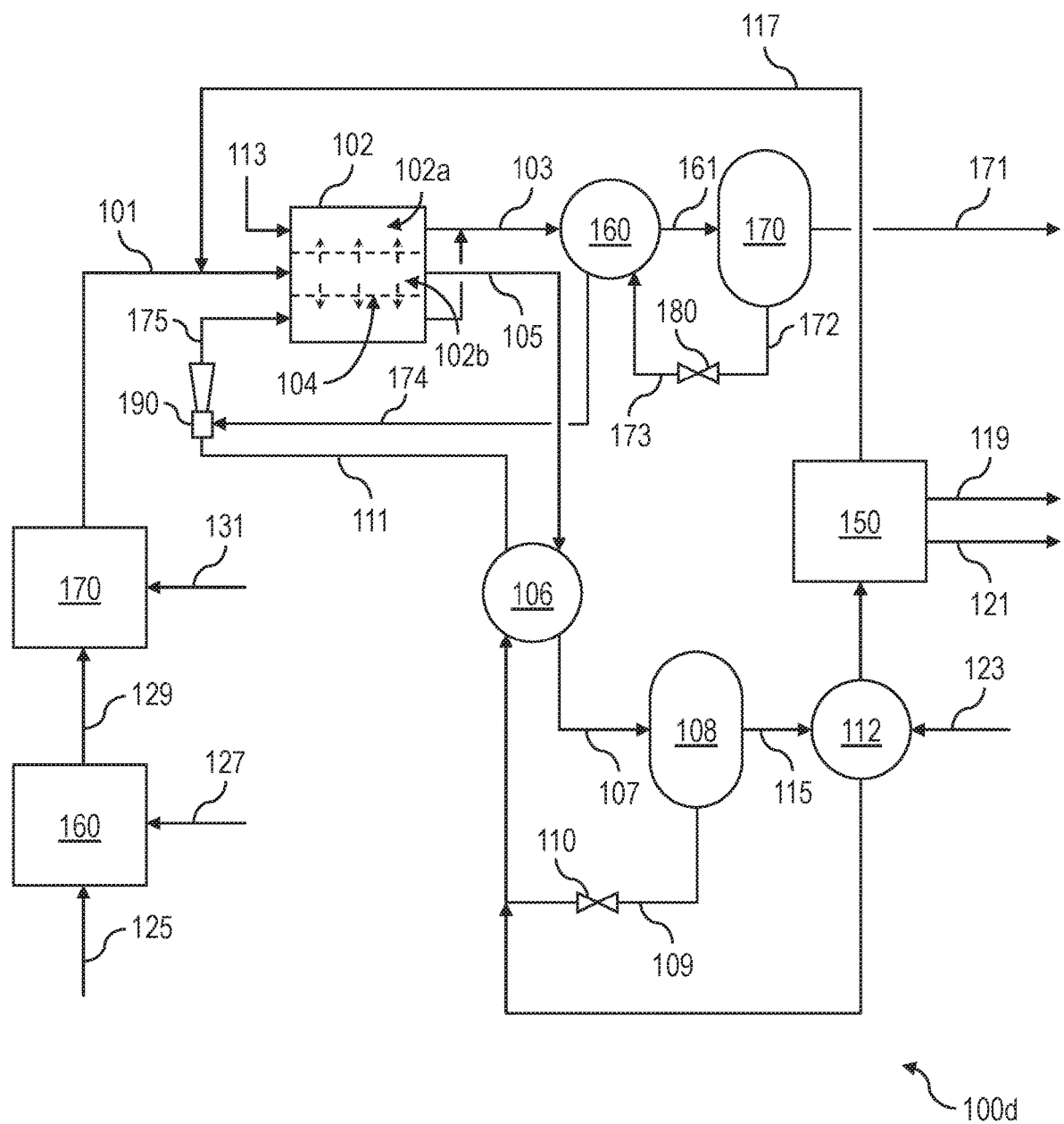
FIG. 1D is a schematic block diagram of an example system for hydrocarbon reforming.

FIG. 1D illustrates an implementation of a system 100d. The system 100d is substantially similar to the system 100c shown in FIG. 1C but includes some additional features. Systems 100a, 100b, 100c, and 100d can include additional equipment (such as valves, pumps, compressors, heat exchangers, and sensors) even though such equipment may be omitted in FIGS. 1A, 1B, 1C, and 1D. Apart from those already mentioned with respect to system 100c, system 100d includes a second expansion device 180 and an ejector 190.

The second liquid phase 172 flows back to the second heat exchanger 160 through the second expansion device 180. The second expansion device 180 is configured to decrease pressure of the second liquid phase 172. The decrease in pressure can facilitate the re-generation of steam. In some implementations, the second expansion device 180 is configured to decrease the pressure of the second liquid phase 172 by a pressure differential in a range of from about 0.2 bar to about 1 bar. The second expansion device 180 can include a restriction orifice, a control valve, a turbine, or any combination of these. In some implementations, the expansion device causes at least a portion of the second liquid phase 172 to flash due to the decrease in pressure. Therefore, in some implementations, the second liquid phase 172 exits the expansion device 180 as a mixed phase stream 193 (for example, a mixture of liquid and vapor).

Heat is transferred from the permeate stream 103 to the second liquid phase 172 via the second heat exchanger 180. Therefore, the second heat exchanger 180 implements heat integration. Heat from the permeate stream 103 causes any remaining liquid in the mixed phase stream 193 to evaporate to form low pressure steam 194. In some implementations, heat from the permeate stream 103 provides both latent heating and sensible heating, such that the low pressure steam 194 is superheated steam.

The low pressure steam 194 flows from the second heat exchanger 180 to the ejector 190. The ejector 190 causes the low pressure steam 194 to mix with the steam 111 which has a greater pressure than the low pressure steam 194. The mixture 194 discharges from the ejector 190 at an intermediate pressure (between the pressure of the low pressure steam 194 and the pressure of the steam 111) and flows to the permeate side 102a of the reactor 102.

Figure 2:
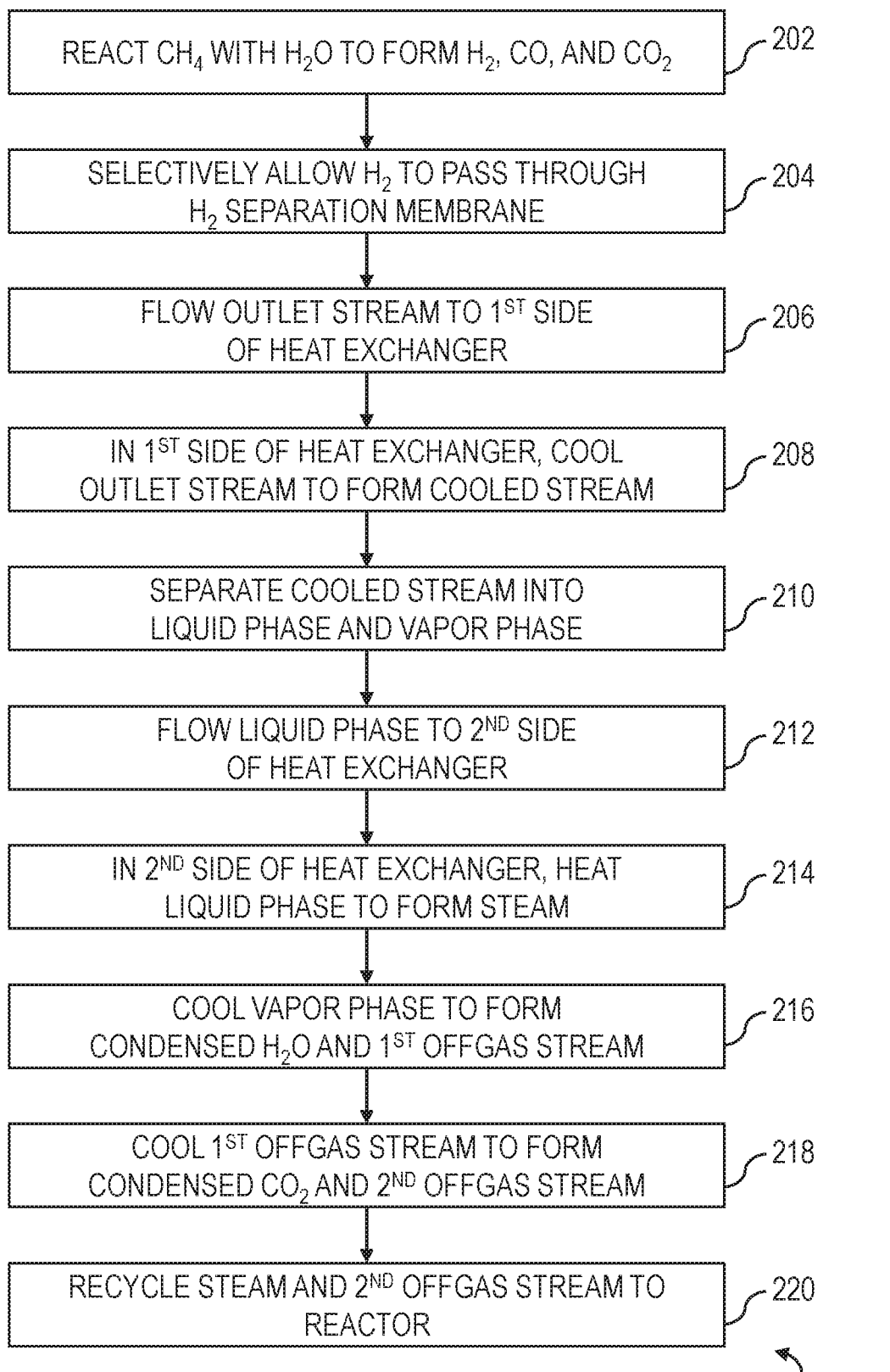
FIG. 2 is a flow chart of an example method of hydrocarbon reforming.

FIG. 2 is a flow chart of a method 200 for steam methane reforming. The method 200 can be implemented, for example, by systems 100a or 100b. At step 202, methane is reacted with water within a reactor (such as the methane reformer 102) in the presence of a catalyst to form hydrogen, carbon monoxide, and carbon dioxide.

In some implementations, the methane that is reacted at step 202 originates from a hydrocarbon stream. In some implementations, the hydrocarbon stream is processed before step 202, for example, to form a steam that predominantly comprises methane. For example, the feedstock stream 125 (including hydrocarbons) can be processed in the sulfur removal unit 160 and the pre-reformer 170 to form the hydrocarbon stream 101 that predominantly comprises methane.

In some implementations, the feedstock stream 125 is compressed to a pressure in a range of from about 2 bar to about 50 bar before flowing to the sulfur removal unit 160. In some implementations, the feedstock stream 125 is compressed to a pressure in a range of from about 10 bar to about 40 bar before flowing to the sulfur removal unit 160. In some implementations, the sulfur removal unit 160 operates at an operating temperature in a range of from about 200° C. to about 300° C. In some implementations, the sulfur removal unit 160 operates at an operating pressure in a range of from about 10 bar to about 50 bar. In some implementations, the sulfur removal unit 160 operates at an operating pressure in a range of from about 20 bar to about 40 bar.

In some implementations, the pre-reformer 170 operates at an operating temperature in a range of from about 300° C. to about 600° C. In some implementations, the pre-reformer 170 operates at an operating temperature in a range of from about 400° C. to about 600° C. In some implementations, the pre-reformer 170 operates at an operating pressure in a range of from about 10 bar to about 50 bar. In some implementations, the pre-reformer 170 operates at an operating pressure in a range of from about 20 bar to about 40 bar. In some implementations, the pre-reformer 170 operates auto-thermally, so that heat does not need to be provided to the pre-reformer 170.

In some implementations, reacting methane with water in the presence of the catalyst at step 202 includes reacting methane with water in the presence of the catalyst at an operating temperature in a range of from about 300° C. to about 700° C. and an operating pressure in a range of from about 10 bar and about 50 bar. In some implementations, the operating temperature in the reactor 102 at step 202 is in a range of from about 400° C. to about 600° C. In some implementations, the operating pressure in the reactor 102 at step 202 is in a range of from about 20 bar to about 40 bar. In some implementations, the operating temperature and operating pressure of the reactor 102 is similar or the same as those of the pre-reformer 170.

At step 204, hydrogen is selectively allowed, by a hydrogen separation membrane positioned within the reactor (such as the hydrogen separation membrane 104), to pass through the hydrogen separation membrane 104 to a permeate side of the reactor (such as the permeate side 102a), while preventing $H_2O$ and carbon-containing compounds (such as $CH_4$, $CO$, and $CO_2$) from passing through the hydrogen separation membrane 104. The $H_2O$ and carbon-containing compounds remain in a retentate side of the reactor (such as the retentate side 102b).

At step 206, an outlet stream from the retentate side 102b of the reactor 102 (such as the retentate stream 105) is flowed to a first side of a heat exchanger (for example, the first side of the heat exchanger 106). In some implementations, the retentate stream 105 flowing from the retentate side 102b of the reactor 102 has an operating temperature in a range of from about 300° C. to about 700° C. In some implementations, the retentate stream 105 flowing from the retentate side 102b of the reactor 102 has an operating temperature in a range of from about 400° C. to about 600° C. In some implementations, the retentate stream 105 flowing from the retentate side 102b of the reactor 102 has an operating pressure in a range of from about 10 bar to about 50 bar. In some implementations, the retentate stream 105 flowing from the retentate side 102b of the reactor 102 has an operating pressure in a range of from about 20 bar to about 40 bar.

At step 208, the outlet stream 105 is cooled in the first side of the heat exchanger 106 to form a cooled stream (such as the cooled stream 107). In some implementations, cooling the outlet stream 105 in the first side of the heat exchanger 106 at step 208 includes cooling the outlet stream 105 to a temperature that is about 1° C. to about 50° C. greater than the saturation temperature associated with the pressure of the permeate side 102a of the methane reformer 102. In some implementations, cooling the outlet stream 105 in the first side of the heat exchanger 106 at step 208 includes cooling the outlet stream 105 to a temperature that is about 5° C. to about 15° C. greater than the saturation temperature associated with the pressure of the permeate side 102a of the methane reformer 102. In some implementations, the outlet stream 105 is cooled to a temperature in a range of from about 80° C. to about 180° C. In some implementations, the outlet stream 105 is cooled to a temperature in a range of from about 100° C. to about 135° C. In some implementations, the outlet stream 105 is cooled to a temperature in a range of from about 125° C. to about 135° C.

At step 210, the cooled stream is separated by a separator (such as the separator 108) into a liquid phase (such as the liquid phase 109) and a vapor phase (such as the vapor phase 115). As mentioned previously, the liquid phase 109 can include a portion of unreacted water from the reactor 102. As mentioned previously, the vapor phase 115 can include a portion of hydrogen formed within the reactor 102, a portion of unreacted methane from the reactor 102, carbon monoxide formed within the reactor 102, and carbon dioxide formed within the reactor 102.

At step 212, the liquid phase 109 is flowed to a second side of the heat exchanger 106. In some implementations, the liquid phase 109 is purified before the liquid phase 109 is flowed to the second side of the heat exchanger 106 at step 212. For example, the liquid phase 109 is purified, so that the fluid flowing to the second side of the heat exchanger 106 at step 212 comprises water that includes negligible amounts of contaminants or none at all. In some implementations, pressure of the liquid phase 109 is decreased by an expansion device (for example, the expansion device 110) before the liquid phase 109 is flowed to the second side of the heat exchanger 106 at step 212. In some implementations, decreasing the pressure of the liquid phase 109 causes a portion of the liquid phase 109 to flash (evaporate).

At step 214, the liquid phase 109 is heated in the second side of the heat exchanger 106 to form steam (such as the steam 111). In some implementations, heating the liquid phase 109 in the second side of the heat exchanger 106 at step 214 includes latent heating and sensible heating, such that the steam 111 that is formed at step 214 is superheated steam.

At step 216, the vapor phase 115 is cooled (for example, by the liquefaction unit 150) to form condensed water (such as the condensed water 121) and a first offgas stream. The first offgas stream is the remaining, non-condensed vapor from the vapor phase 115 after cooling at step 216. The condensed water can be separated from the first offgas stream before step 218.

In some implementations, the vapor phase 115 is pre-cooled (for example, by the second heat exchanger 112) before the vapor phase 115 is cooled at step 216. The vapor phase 115 can be pre-cooled by the second heat exchanger 112 via heat exchange with make-up water 123. In some implementations, the operating temperature of the vapor phase 115 at the exit of the second heat exchanger 112 is about 5° C. to about 50° C. greater than the operating temperature of the make-up water 123 entering the second heat exchanger 112.

At step 218, the first offgas stream is cooled (for example, by the liquefaction unit 150) to form condensed $CO_2$ (such as the condensed $CO_2$ 119) and a second offgas stream. The second offgas stream is the remaining, non-condensed vapor from the first offgas stream after cooling at step 218. In some implementations, cooling the first offgas stream at step 218 includes cooling the first offgas stream to a temperature in a range of from about −55° C. to about −20° C. The condensed $CO_2$ 119 can be separated from the second offgas stream and purified to form a carbon dioxide product stream.

At step 220, the steam 111 and the second offgas stream 117 is recycled to the reactor 102. In some implementations, the second offgas stream 117 flows to the retentate side 102b of the reactor 102. In some implementations, the second offgas stream 117 mixes with the hydrocarbon stream 101, and the mixture flows to the retentate side 102b of the reactor 102. In some implementations, the second offgas stream 117 mixes with the sulfur-free hydrocarbon stream 129, and the mixture flows to the pre-reformer 170.

In some implementations, the steam 111 flows to the permeate side 102a of the reactor 102. In some implementations, the steam 111 flows to the retentate side 102b of the reactor 102. In some implementations, the steam 111 mixes with make-up steam (such as the make-up steam 113), and the mixture flows to the reactor 102 to the permeate side 102a, retentate side 102b, or both. In implementations where the steam 111 flows to the retentate side 102b of the reactor 102, the steam 111 can be compressed (for example, by a compressor) before flowing to the retentate side 102b of the reactor 102. In some implementations, the steam 111 provides about 20% to about 80% of the total steam requirement for adequate operation of the reactor 102. In some implementations, the steam 111 provides about 40% to about 60% of the total steam requirement for adequate operation of the reactor 102. The steam 111 flowed to the reactor 102 functions not only as increased reactant (Reactions (1) and (2)) but also as a sweep gas for the hydrogen that is formed in the reactor 102. The re-generation of steam 111 allows for less make-up steam 113 (and make-up water 123) to be used by system 100a (and system 100b).

A second outlet stream (for example, the permeate stream 103) can flow from the permeate side 102a of the reactor 102. In some implementations, an operating pressure of the permeate stream 103 is in a range of from about 0.5 bar to about 10 bar. In some implementations, the operating pressure of the permeate stream 103 is in a range of from about 1 bar to about 3 bar. As mentioned previously, the permeate stream 103 includes hydrogen that was produced within the reactor 102. In some implementations, the permeate stream 103 includes unreacted water. In some implementations, the permeate stream 103 is purified to form a hydrogen product stream. For example, the permeate stream 103 is processed to purify the permeate stream 103 and remove $H_2O$ and any other contaminants.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
   reacting, within a reactor, a hydrocarbon with water in the presence of a catalyst to form hydrogen, carbon monoxide, and carbon dioxide;
   selectively allowing, by a hydrogen separation membrane positioned within the reactor, hydrogen to pass through the hydrogen separation membrane to a permeate side of the reactor, while preventing water and carbon-containing compounds from flowing from a retentate side of the reactor through the hydrogen separation membrane to the permeate side of the reactor;
   flowing an outlet stream from the retentate side of the reactor to a first side of a heat exchanger;
   cooling, in the first side of the heat exchanger, the outlet stream to form a cooled stream;
   separating, by a separator, the cooled stream into a liquid phase and a vapor phase, the liquid phase comprising a portion of unreacted water from the reactor, the vapor phase comprising a portion of hydrogen formed within the reactor, a portion of unreacted hydrocarbon from the reactor, carbon monoxide formed within the reactor, and carbon dioxide formed within the reactor;
   flowing the liquid phase from the separator to a second side of the heat exchanger;
   heating, in the second side of the heat exchanger, the liquid phase to form steam;
   cooling the vapor phase to form condensed water and a first offgas stream;
   cooling the first offgas stream to form condensed carbon dioxide and a second offgas stream; and
   recycling the steam and the second offgas stream to the reactor.

2. The method of claim 1, wherein reacting the hydrocarbon with water in the presence of the catalyst comprises reacting methane with water in the presence of the catalyst at an operating temperature in a range of from about 400 degrees Celsius (° C.) to about 600° C. and at an operating pressure in a range of from about 10 bar to about 40 bar.

3. The method of claim 2, wherein cooling, in the first side of the heat exchanger, the outlet stream comprises cooling the outlet stream to a temperature that is about 5° C. to about 15° C. greater than a saturation temperature associated with the pressure of the permeate side of the reactor.

4. The method of claim 3, comprising decreasing, by an expansion device, pressure of the liquid phase before flowing the liquid phase to the second side of the heat exchanger.

5. The method of claim 4, wherein heating, in the second side of the heat exchanger, the liquid phase comprises latent heating and sensible heating, such that the steam that is formed is superheated steam.

6. The method of claim 4, comprising purifying the liquid phase from the separator before flowing the liquid phase to the second side of the heat exchanger.

7. The method of claim 4, comprising separating the condensed water from the first offgas stream before cooling the first offgas stream.

8. The method of claim 7, wherein cooling the first offgas stream comprises cooling the first offgas stream to a temperature in a range of from about −55° C. to about −20° C.

9. The method of claim 8, comprising purifying the condensed carbon dioxide to form a carbon dioxide product stream.

10. The method of claim 1, comprising:
    flowing a second outlet stream from the permeate side of the reactor, the second outlet stream comprising a remaining portion of hydrogen formed within the reactor; and
    purifying the second outlet stream to form a hydrogen product stream.

11. The method of claim 10, comprising:
    cooling the second outlet stream to condense at least a portion of water present in the second outlet stream;
    separating the condensed portion of water from the second outlet stream; and
    flowing the condensed portion of water separated from the second outlet stream to the second side of the heat exchanger.

12. The method of claim 10, comprising:
cooling the second outlet stream to condense at least a portion of water present in the second outlet stream;
separating the condensed portion of water from the second outlet stream;
decreasing the pressure of the condensed portion of water separated from the second outlet stream;
heating the condensed portion of water with decreased pressure to produce a second stream of steam; and
flowing the second stream of steam to the permeate side of the reactor.

\* \* \* \* \*